(12) United States Patent
Hall et al.

(10) Patent No.: US 7,383,944 B2
(45) Date of Patent: Jun. 10, 2008

(54) SANITARY CONVEYOR CENTER DRIVE ASSEMBLY

(75) Inventors: Scott M. Hall, Sussex, WI (US); Craig J. Bude, Waukesha, WI (US)

(73) Assignee: Dorner Mfg. Corp., Hartland, WI (US)

( * ) Notice: Subject to any disclaimer, the term of this patent is extended or adjusted under 35 U.S.C. 154(b) by 39 days.

(21) Appl. No.: 11/426,454

(22) Filed: Jun. 26, 2006

(65) Prior Publication Data

US 2007/0295583 A1 Dec. 27, 2007

(51) Int. Cl.
*B65G 45/00* (2006.01)

(52) U.S. Cl. .................. 198/860.3; 198/835; 198/816; 198/860.5

(58) Field of Classification Search ................ 198/835, 198/813–816, 860.3–860.5
See application file for complete search history.

(56) References Cited

U.S. PATENT DOCUMENTS

| | | | | |
|---|---|---|---|---|
| 2,875,888 | A * | 3/1959 | Swain et al. ................ | 198/816 |
| 3,212,628 | A * | 10/1965 | Massey et al. .............. | 198/311 |
| 3,743,078 | A * | 7/1973 | Pittoreau ................. | 198/860.3 |
| 5,156,260 | A * | 10/1992 | Dorner et al. .............. | 198/813 |
| 5,427,221 | A * | 6/1995 | Spriggs et al. .............. | 198/335 |
| 6,203,447 | B1 * | 3/2001 | Dillard ....................... | 473/316 |
| 6,318,545 | B1 * | 11/2001 | Ross, II ................... | 198/860.3 |
| 6,708,817 | B2 * | 3/2004 | Klabisch et al. ............ | 198/813 |
| 6,726,532 | B2 * | 4/2004 | Lin et al. ..................... | 451/28 |
| 6,843,365 | B2 * | 1/2005 | Baker ........................ | 198/813 |
| 6,871,737 | B2 | 3/2005 | Ertel et al. | |
| 6,971,509 | B2 | 12/2005 | Ertel et al. | |
| 7,004,309 | B2 * | 2/2006 | Sherwood ................... | 198/813 |
| 7,014,035 | B2 * | 3/2006 | Wiggins ..................... | 198/497 |

* cited by examiner

*Primary Examiner*—Mark A Deuble
(74) *Attorney, Agent, or Firm*—Andrus, Sceales, Starke & Sawall, LLP

(57) ABSTRACT

A conveyor assembly has a continuous conveyor belt driven between a pair of spaced side frame members by a center drive assembly having a pair of spaced side plates connected to the side frame members. A drive roller arrangement is driven by a drive motor arrangement coupled to the drive roller arrangement to move the conveyor belt. A freely rotatable guide roller arrangement is slidably mounted between the side frame members and the side plates between an operating position in which the conveyor belt passes around the guide roller assembly before engaging the drive roller arrangement, and a cleaning position in which the guide roller arrangement is slidably removable away from the side frame members and the side plates and out of engagement with the conveyor belt. The guard structure is retained in the operating position by elongated retaining pins that are pushed into a frictional engagement with the side plates, the guide roller arrangement and the guard structure, and removed to the cleaning position by pulling the retaining pins out of the frictional engagement. Each of the guard structures includes a roller adjustment device that can be selectively operated to adjust the orientation of the guide roller assembly between the spaced side frame members of the conveyor assembly.

32 Claims, 8 Drawing Sheets

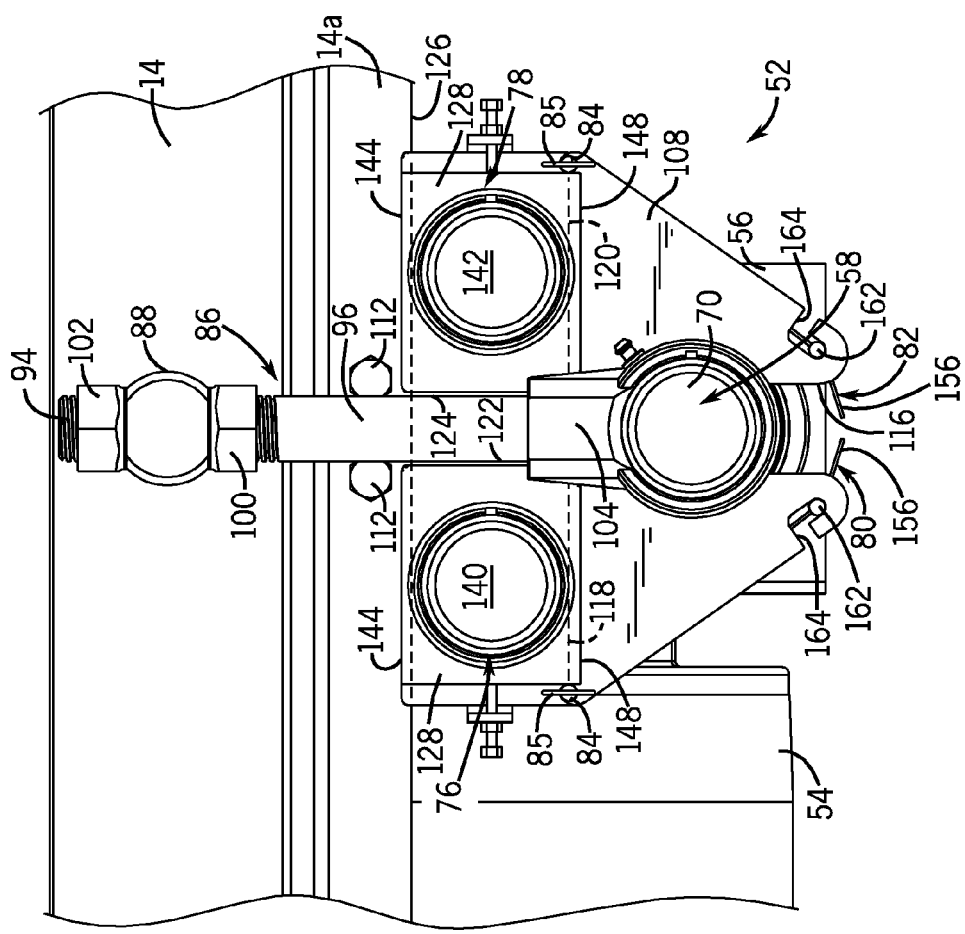
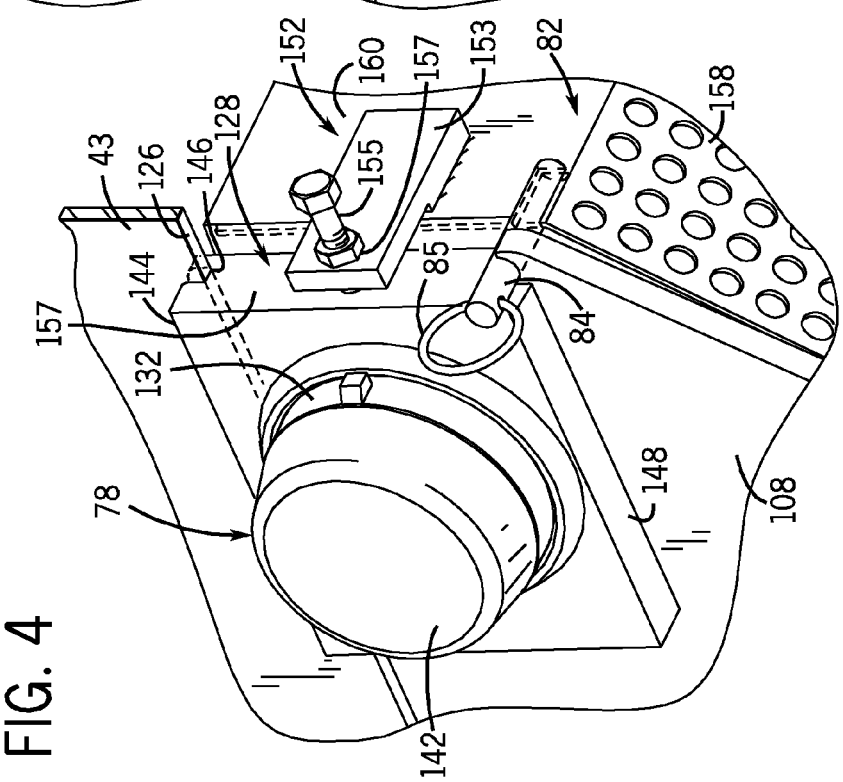

SANITARY CONVEYOR CENTER DRIVE ASSEMBLY

FIELD OF THE INVENTION

The present invention relates to a center drive assembly for a conveyor assembly that is particularly useful in a sanitary environment. More specifically, the present invention relates to a center drive assembly in which certain components of the center drive assembly may be quickly removed to enable the center drive assembly and the conveyor belt to be easily washed and sanitized.

BACKGROUND OF THE INVENTION

Presently in food processing conveyor applications, conveyors must be manufactured such that the conveyor belt can be removed and the entire conveyor frame assembly sanitized. Following sanitization, the conveyor belt must be reinstalled for continued operation. The present invention allows a center drive assembly for driving the conveyor belt to be configured in such a way that sanitation may occur without removing the conveyor belt and without complicated disassembly of the center drive assembly.

Currently, numerous guidelines exist regarding the type of conveyor assembly that can be used in a sanitary environment, such as in a food processing facility. Typically, these guidelines require that the conveyor frame assembly must be washable and thus sanitized. As such, conveyor frame assemblies constructed for use in a sanitary food processing facility must be easily disassembled to allow complete cleaning. Preferably, the disassembly should require no tools, if possible.

Prior art center drive assemblies for conveyors generally include a drive motor and gear box for driving a stationary drive roller arrangement engageable with the conveyor belt. Center drive assemblies further include at least one guide or tension roller arrangement in further engagement with the conveyor belt and guard structure for protecting the roller arrangements. The problem with known center drive assemblies is that the roller arrangements and the guard structure are not completely removable from the conveyor frame assemblies without using tools, various screw-type fasteners and laborious disassembly.

Accordingly, the present invention provides for a center drive assembly that can be used in a sanitary environment which allows the conveyor belt to remain on the conveyor assembly. The present invention also enables components of the center drive assembly to be easily manually removed without the need for tools and bolt and nut connectors so that the center drive assembly and the conveyor belt can be efficiency sanitized with minimal effort and time.

SUMMARY OF THE INVENTION

The present invention relates to a conveyor assembly having a continuous conveyor belt driven between a pair of spaced side frame members by a center drive assembly having a pair of spaced side plates connected to the side frame members. A drive roller arrangement is engageable with the conveyor belt and is driven by a drive motor arrangement mounted on the conveyor assembly and coupled to the drive roller arrangement to move the conveyor belt. A freely rotatable guide roller arrangement is mounted between the side plates and is engageable with the conveyor belt. A guard structure is attached to the side plates for protecting the conveyor belt. The invention is improved by the guide roller arrangement being slidably mounted between the side frame members and the side plates between an operating position in which the conveyor belt passes around the guide roller assembly before engaging the drive roller arrangement, and a cleaning position in which the guide roller arrangement is slidably removable away from the side frame members and the side plates and out of engagement with the conveyor belt.

The guard structure is retained in the operating position by elongated retaining pins that are pushed into a frictional engagement with the side plates and the guard structure, and removed to the cleaning position by pulling the retaining pins out of the frictional engagement. The guard structure includes an adjustment arrangement that contacts the guide roller arrangement to securely position the guide roller arrangement relative to the side plates. The guide roller arrangement includes slide block structure slidably movable into and out of cutouts defined by vertical end horizontal edges of the side plates and lowermost edges of the side frame members. The slide block structure is provided with grooves for receiving the lowermost edges of the side frame members and the horizontal edges of the side plates. The guide roller arrangement preferably includes a pair of guide roller assemblies. The guard structure includes a pair of removable guards, each guard having a bent configuration with an upper portion disposed between the side plates, an intermediate portion and a lower portion formed with rod ends engageable in slots formed in the side plates when the guide roller arrangement is in the operating position. The guards are retained in the operating position by the retaining pins acting against upper portions of the guards. The guards are removed to the cleaning position by extracting the retaining pins, pivoting the guards about the rod ends in the slots and manipulating the rod ends out of the slots. The guide roller arrangement and the guard structure are removed to the cleaning position without removal of the conveyor belt and without the use of tools.

In another aspect of the invention, a center drive assembly is provided for a conveyor having a frame assembly extending from a first end to a second end and including a pair of spaced side frame members. At least one tail assembly is mounted between the side frame members and is movable toward and away from the first end of the frame assembly. A continuous conveyor belt has an upper run and a lower run engaged around the tail assembly and is positioned between the side frame members. The center drive assembly includes a pair of spaced side plates each configured for attachment to one of the side frame members between the first and second end of the side frame assembly with the side plates extending below the side frame members. A drive roller arrangement is mounted between the pair of spaced side plates that are positioned such that the lower run of the conveyor belt passes around at least a portion of an outer circumference of the drive roller arrangement. A drive motor arrangement is mounted on one of the side frame members and is coupled to the drive roller arrangement to rotate the drive roller arrangement and move the conveyor belt along a longitudinal length of the frame assembly. A pair of guide roller assemblies is mounted for free rotation between the spaced side plates wherein the guide roller assemblies are slidably positioned on the side frame members and the side plates between an operating position in which the lower run of the conveyor belt passes around at least portions of the outer circumference of the guide roller assemblies before engaging the drive roller arrangement. The guide roller assembly has a cleaning position in which the guide roller assemblies are slidably removable away from the side frame members and the side plates and out of engagement with the conveyor belt. A guard structure covers the drive roller arrangement, the guide roller assemblies and the conveyor belt and is retained between the side plates in the operating position and is removed from the side plates in the cleaning position. The guide roller assemblies and the guard structure are retained in the operating position and removed to the cleaning position without tightening and loosening of any cooperating connectors and without removal of the conveyor belt.

The side plates are formed with slots for receiving opposite ends of the drive roller arrangement. The drive motor arrangement includes a drive motor coupled to a gear box that is supported on one of a pair of roller housings of the drive roller arrangement which is suspended from one of the side frame members. The guard structure is retained in the operating position by a set of elongated retaining pins that are pushed into a frictional engagement with the side plates and the guard structure, and removed to the cleaning position by pulling the retaining pins out of the frictional engagement. Each guide roller assembly includes a pair of side blocks which are slidably movable into and out of cutouts defined by vertical and horizontal edges of the side plates and lowermost edges of the side frame members. The guard structure includes a pair of removable guards, each guard having a bent configuration with an upper portion disposed between the side plates, a perforated intermediate portion and a lower portion having rod ends engageable in L-shaped slots formed in the side plates when the guide roller assemblies are in the operating position. The guards are retained in the operating position by the retaining pins acting against the upper portions of the guards. The guards are removed to the cleaning position by extracting the retaining pins, pivoting the guards about the rods ends in the slots, and manipulating the rod ends out of the slots. Each of the slide blocks have upper and lower edges provided with grooves for receiving the lowermost edges of the side frame members and horizontal edges of the side plates, and inner edges positioned adjacent top portions of the side plates when the guide roller assemblies are in the operating position. The roller housings on the drive roller arrangement are attached to support arms that are adjustably mounted on axles extending outwardly from the side frame members.

BRIEF DESCRIPTION OF THE DRAWINGS

The drawings illustrate the best mode presently contemplated of carrying out the invention.

In the drawings:

FIG. 4 is an enlarged detail view of the guide roller assemblies and guards used in the center drive assembly as taken on line 4-4 of FIG. 2;

FIG. 6 is an elevational view of the center drive assembly of FIG. 2;

DETAILED DESCRIPTION OF THE INVENTION

Figure 1:
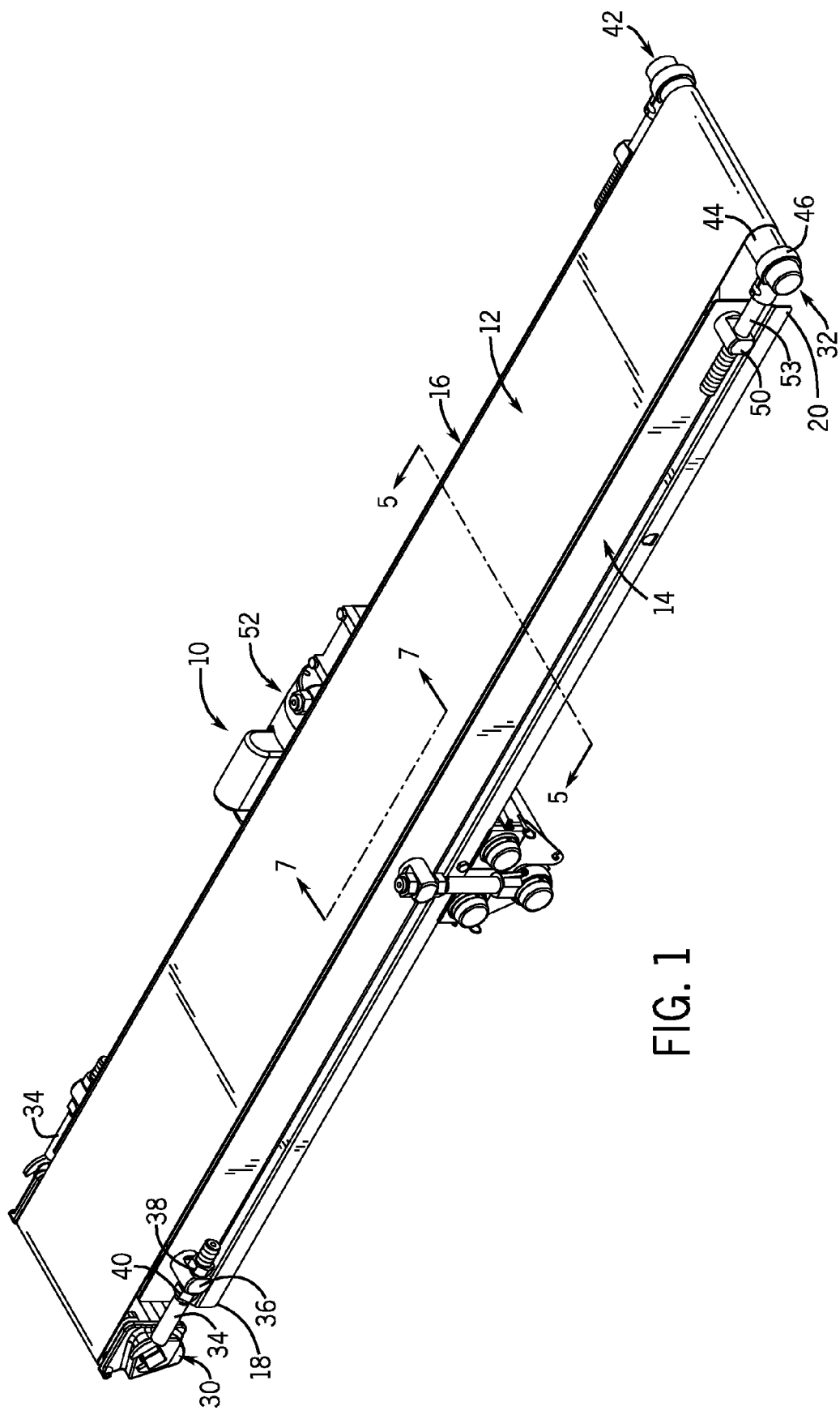
FIG. 1 is a perspective view of a sanitary conveyor center drive assembly.

FIG. 1 illustrates a sanitary conveyor assembly 10 that includes a continuous conveyor belt 12 used to transport articles. The conveyor assembly 10 includes a pair of side frame members 14, 16 spaced from each other by the width of the conveyor belt 12. Each side frame member 14, 16 extends from a first end 18 to a second end 20. The side frame members 14, 16 are joined by a series of rail supports as seen at 22 in FIG. 5. The rail supports 22 receive and support a series of spaced slide rails 24 that extend longitudinally of the conveyor assembly 10. The side frame members 14, 16 are also joined by a series of cylindrical cross supports, one of which is seen at 25 in FIGS. 7-9. The cross supports 25 provide further support for the slide rails 24.

The continuous conveyor belt 12 defines an upper run 26 (FIGS. 1 and 5) which is supported by the slide rails 24, and a lower run 28 (FIGS. 2, 3, 5 and 7-9) which extends generally parallel to the upper run 26. The continuous conveyor belt 12 is particularly useful in a sanitary conveyor application and is constructed of a material which is easily sanitized and inhibits the growth of bacteria.

The transition from the upper run 26 to the lower run 28 occurs over tail assemblies 30, 32 at opposite ends 18, 20 of the conveyor assembly 10. Tail assembly 30 takes the form of a transfer tail assembly, such as disclosed in pending U.S. patent application Ser. No. 11/186,739 filed Jul. 21, 2005, which is herein incorporated by reference. Tail assembly 30 includes a pair of side arms 34, each of which extends through an axle 36 extending across the width of conveyor assembly 10. The back end of side arm 34 extends past the axle 36 and allows the side arms 34 to move generally along the longitudinal axis of the conveyor assembly 10. The movement of side arms 34 relative to the axle 36 allows the transfer tail assembly 30 to adjust the tension in conveyor belt 12. The back end of each side arm 34 is threaded and receives a pair of nuts 38, 40, one on each side of the axle 36. Adjustment of the nuts 38, 40 facilitates setting the transfer tail assembly 30 in its desired position to tension the conveyor belt 12.

The tail assembly 32 opposite tail assembly 30 includes a roller assembly 42 having a roller 44 engaged with the conveyor belt 12. Each end of the roller assembly 42 is provided with a roller housing 46 having a side arm 53 connected thereto. Similar to side arms 34, each side arm 53 extends through an axle 50 extending across the width of the conveyor assembly 10, and is movable relative to the axle 50 to adjust tension on the conveyor belt. The back ends of the side arms 53 are threaded and receive nuts (not shown) for changing the length of the side arms 53 and retaining the desired belt tension. Other suitable retaining arrangements may be used to adjust the position of the side arms 34, 53 such as provision of a retaining pin which passes through a hole in the axle 36, 50 and one of the series of aligned slots or notches formed in the side arms 34, 53. It should be understood that, if desired as for cleaning purposes, the tail assemblies 30, 32 may be completely removed from the conveyor assembly 10 without any additional tooling.

Referring back to FIG. 1, the conveyor belt 12 is driven by a center drive assembly 52 that is suspendedly mounted from the side frame members 14, 16 beneath conveyor assembly 10 and located between the tail assemblies 30, 32. Although center drive assemblies are known, the center drive assembly 52 of the present invention provides advantages in cleaning ease currently not available in sanitary conveyor assemblies.

Figure 2:
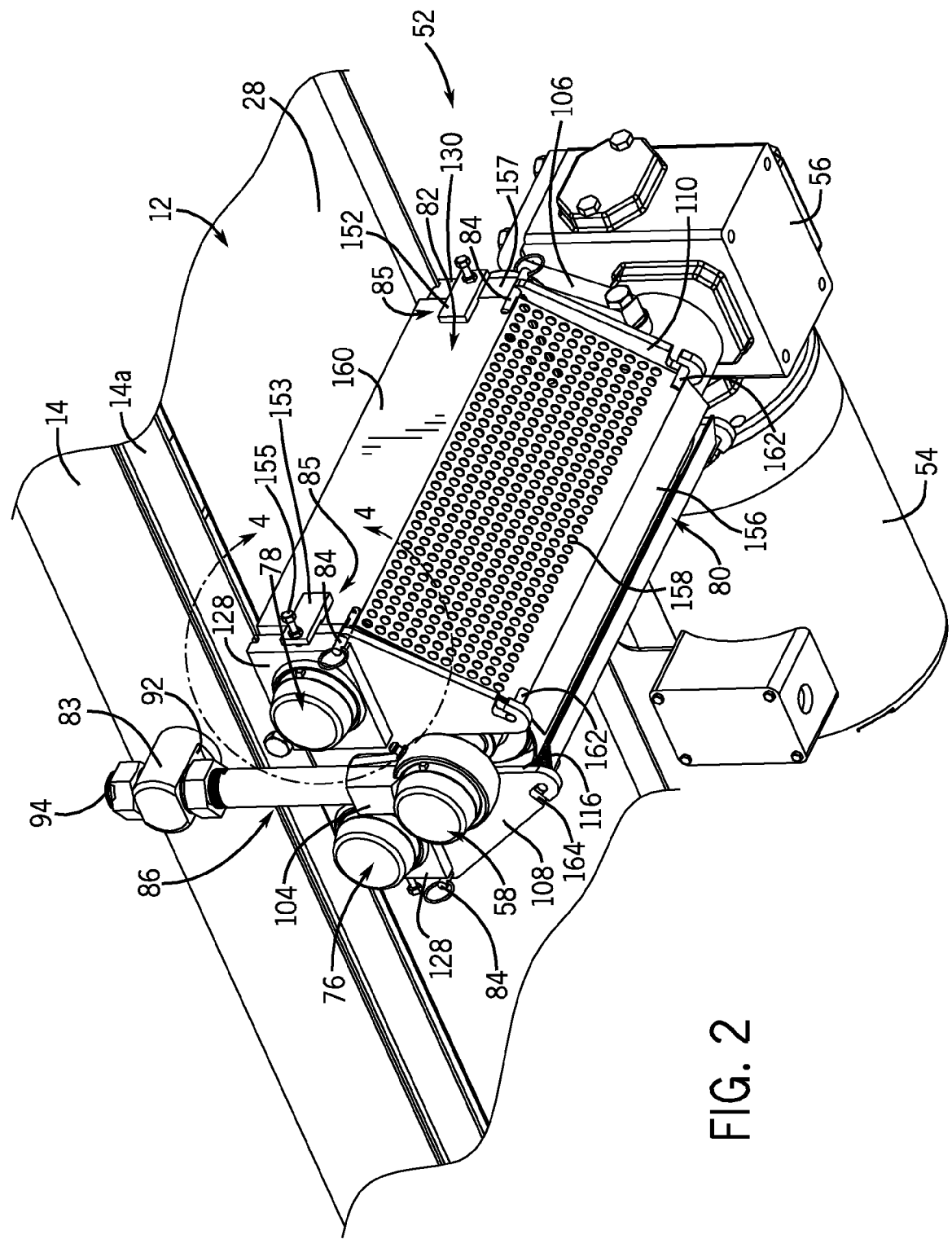
FIG. 2 is enlarged perspective view of the center drive assembly of FIG. 1.
Figure 3:
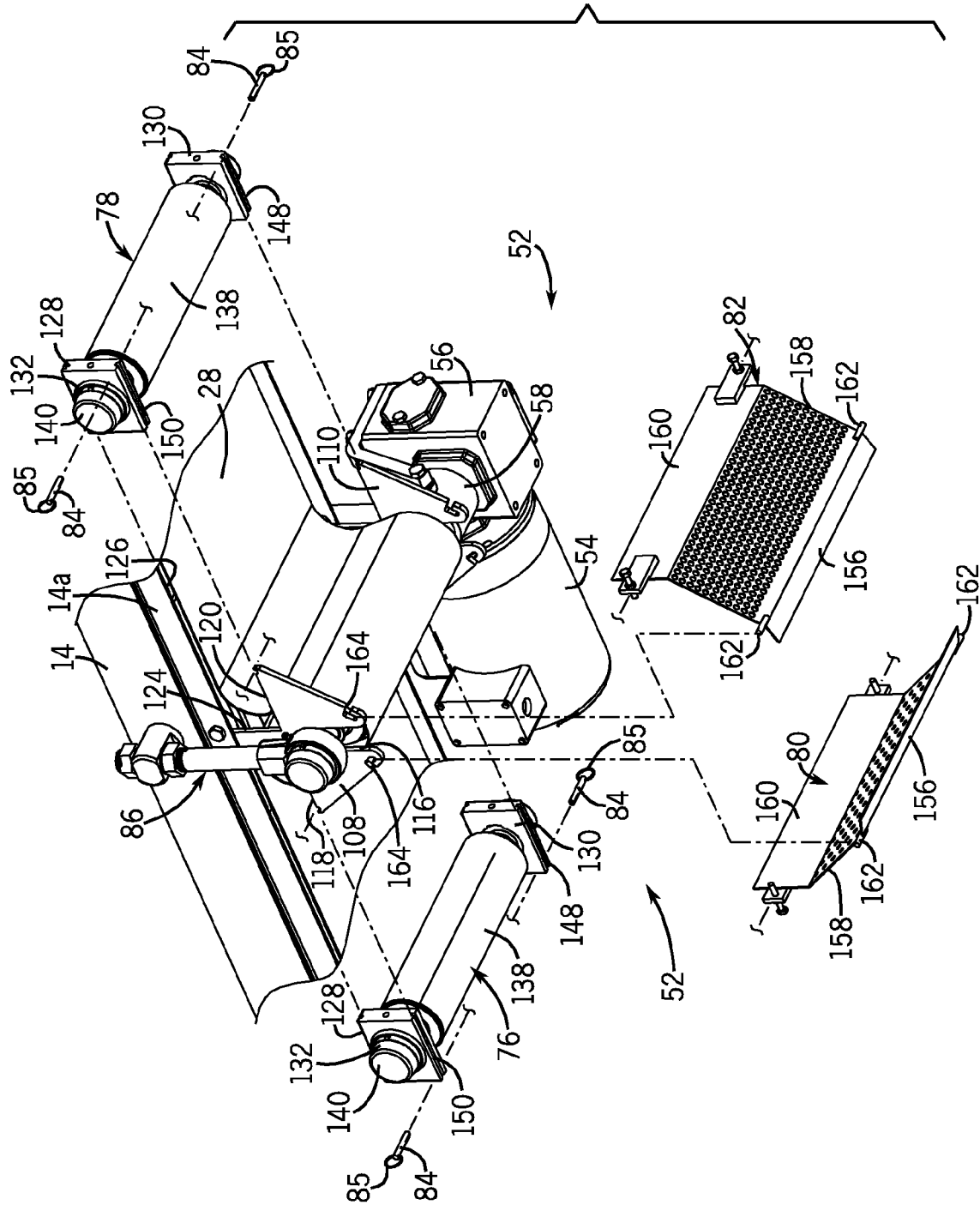
FIG. 3 is an exploded view of the center drive assembly of FIG. 2.

Referring to FIGS. 2 and 3, the center drive assembly 52 is generally comprised of a drive motor 54 and an associated gear box 56 used to provide a motive force for rotating a drive roller assembly 58 engaged with the conveyor belt 12, and thus move the conveyor belt 12 in a continuous path. As seen best in FIGS. 5 and 7-9, the drive roller assembly 58 includes a drive roller 60 and a belt-engaging drive roller 61 having a center shaft 62 extending between a first end 64 and a second end 66. The first end 64 is retained in a roller housing 68 having an internal bearing assembly and has a protective cap 70. The second end 66 of shaft 62 passes through a gear box support 72 and extends through the gear box 56 where it is retained by connectors 74. The center drive assembly 52 is further comprised of a pair of removable guide roller assemblies 76, 78, a pair of removable guards 80, 82, a set of four retaining pins 84, a series of four roller adjustment assemblies 85 and a mounting arrangement 86 on each side of the side frame members 14, 16 for securing the entire center drive structure to the conveyor assembly 10.

Figure 5:
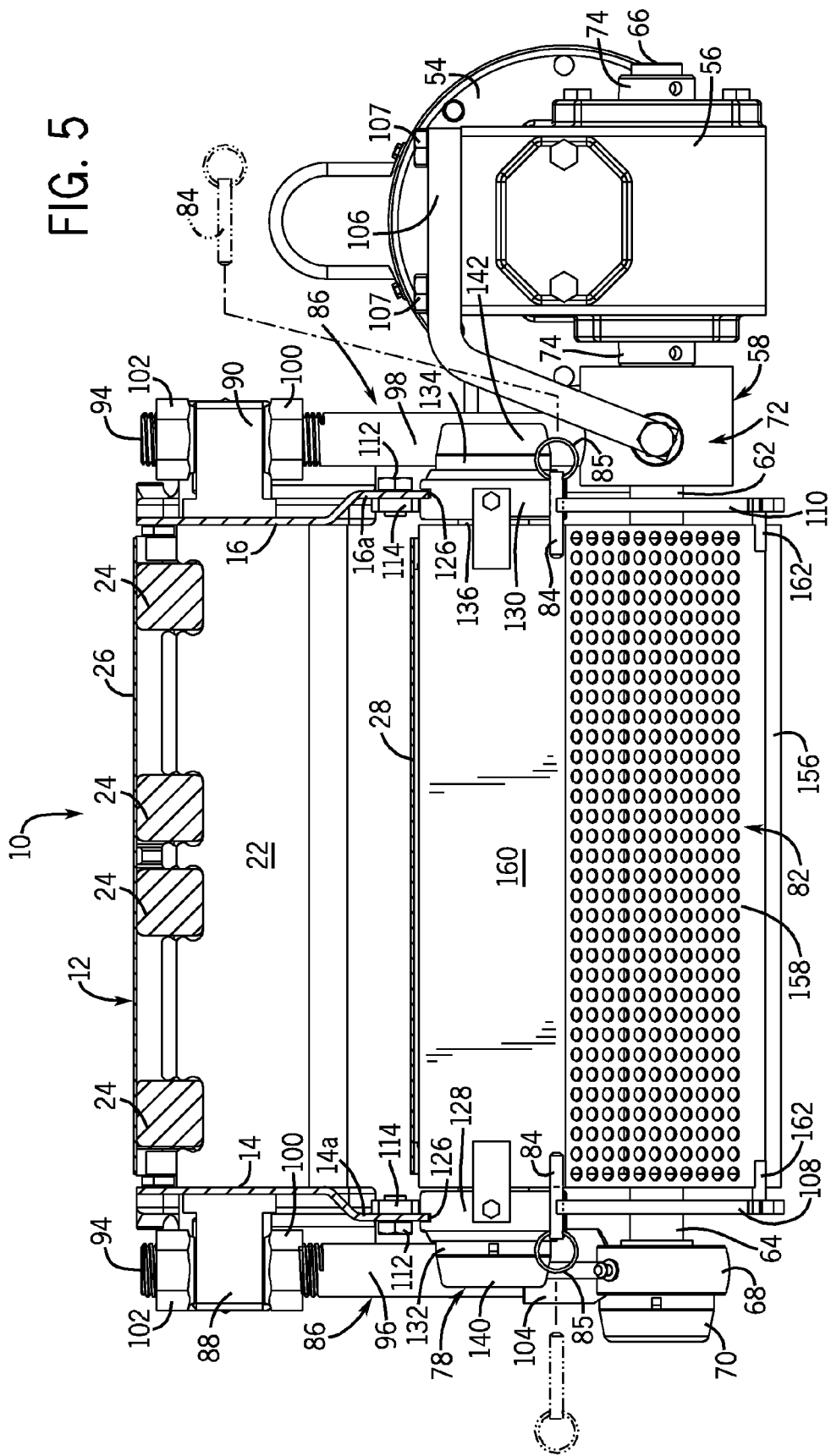
FIG. 5 is sectional view taken on line 5-5 of FIG. 1.

With additional reference to FIGS. 5 and 6, the mounting arrangements 86 include a pair of spaced support stubs 88, 90 extending outwardly from upper portions of the side frame members 14, 16. Support stubs 88, 90 are formed with open ends 92 (FIG. 2) for receiving threaded top ends 94 of spaced support arms 96, 98. Nuts 100, 102 are provided on the threaded top ends 94 above and below the support stubs 88, 90 to retain the support arms 96, 98 thereon. A lower end of support arm 96 is secured to the roller housing 68. A lower end of the support arm 98 is joined to an extension 104 on the gear box support 72. To provide additional support, a brace 106 extends from the gear box support 72 to the gear box 56 where it is secured by fasteners 107.

The mounting arrangements 86 further include a pair of spaced side plates 108, 110 having top portions secured to lower, offset portions 14a, 16a of the side frame members 14, 16 by bolts 112 and nuts 114. Lower portions of the side plates 108, 110 are formed with slots 116 that receive first and second ends 64, 66 of the drive center shaft 62 at locations inboard of the roller housings 68, 72 as seen in FIG. 5. The lower portions of the side plates 108, 110 have horizontal edges 118, 120, and the upper portions of the side plates 108, 110 have vertical edges 122, 124. As seen best in FIG. 3, the edges 118, 120, 122, 124 and lowermost horizontal edges 126 of the offset portions 14a, 16a define cutouts for receiving identical slide blocks 128, 130 formed on opposite ends of the guide roller assemblies 76, 78. In each guide roller assembly 76, 78, the slide blocks 128, 130 serve as housings for bearing assemblies 132, 134 at opposite ends of a freely rotatable center shaft 136 (FIG. 5) upon which a guide roller 138 is mounted. The guide roller assemblies 76, 78 have protective caps 140, 142 at opposite ends.

Figure 9:
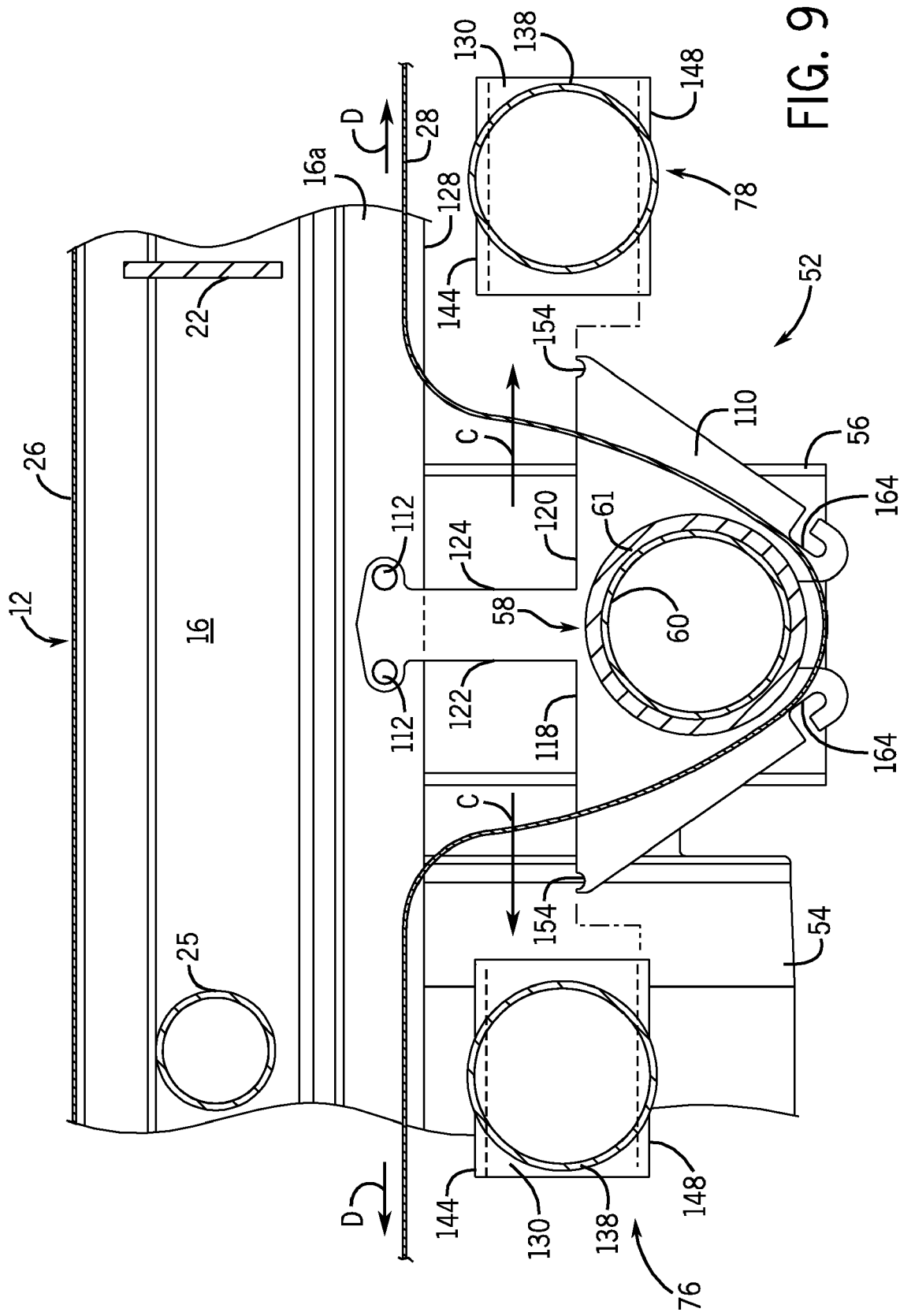
FIG. 9 is a view similar to FIG. 8 showing removal of the guide roller assemblies from the center drive assembly.

As most clearly seen in FIGS. 3 and 6, an upper edge 144 of each slide block 128, 130 is formed with a channel 146 (FIG. 4) for receiving the lowermost edge 126 of offset portions 14a, 16a. A lower edge 148 of each slide block 128, 130 is formed with a channel 150 (FIG. 3) for receiving the edges 118, 120 of the side plates 108, 110. With this construction, the slide blocks 128, 130 are slidably mounted between the bottom of the side frame members 14, 16 and the side plates 108, 110 so that the guide roller assemblies 76, 78 are freely rotatably mounted in an operating, belt-engaging position (FIGS. 2, 6, 7) or slidably removed to a non-belt engaging, cleaning position (FIGS. 3 and 9).

The removable guards 80, 82 are used to protect the drive roller assembly 58, the guide roller assemblies 76, 78 and the conveyor belt 12 when they are in their operating position. Each guard 80, 82 has a bent configuration including a lower portion 156, an intermediate portion 158 which is perforated and an upper portion 160. The lower portion 156 is provided with rod ends 162 that are received and normally retained in L-shaped slots 164 formed in the bottom of side plates 108, 110. In the operating position, the upper portions 160 of guards 80, 82 are held in place by elongated portions of the retaining pins 84 as been seen in FIGS. 2 and 4. The force of the upper portions 160 of the guards 80,82 acting against the elongated portions of the retaining pins 84 tends to keep the pins 84 from moving axially outwardly and withdrawing out of engagement with the slide blocks 128, 130 and side plates 108, 110.

As best shown in FIGS. 2 and 4, each of the guards 80, 82 include a pair of roller adjustment devices 152 mounted to the guard upper portion 160. Each of the roller adjustment devices 152 includes a main body 153 and a threaded tracking bolt 155 that extends through the main body 153. The threaded tracking bolt 155 passes through the main body 153 and is received through a threaded jam nut 157.

As best illustrated in FIG. 4, the threaded shaft of the tracking bolt 155 extends through the main body 153 and the face of the threaded shaft contacts an outer face surface 157 of the respective slide block 128, 130. Rotation of the tracking bolt 155 in a first direction relative to the stationary main body 153 causes the end of the tracking bolt 155 to press into contact with the outer face surface 157 and move the respective slide block 128, 130 further into the channel of the respective side plate 108, 110. Rotation of the tracking bolt 155 in a second direction opposite the first direction retracts the end of the tracking bolt 155 which allows the respective slide block 128, 130 to move further out of the channel within the respective side plate 108, 110. The movement of the slide block 128, 130 out of the channel is a result of the tension force applied to the guide roller by the conveyor belt 28.

As can best be seen in FIG. 2, each of the guards 80, 82 includes a pair of the roller adjustment devices 152 that can each be adjusted independently from the other roller adjustment devices. Since each of the slide blocks 128, 130 are received in separate channels, the selective adjustment of the roller adjustment devices 152 allows the orientation of each of the guide roller assemblies 76, 78 to be independently adjusted to provide enhanced tracking for the conveyor belt.

When the guard 80, 82 is in the operating, protective position shown in FIG. 4, the roller adjustment devices 152 retain the respective slide block 128, 130 within the channel 150 against the tension force created by the conveyor belt.

As can be understood in FIG. 2, the orientation of the guide roller assembly 76, 78 can be adjusted by rotating one of the tracking bolts 155 relative to the stationary main body 153. In this manner, the adjustment arrangement 85 provides for tracking adjustment of the pair of guide roller assemblies 76, 78.

Figure 7:
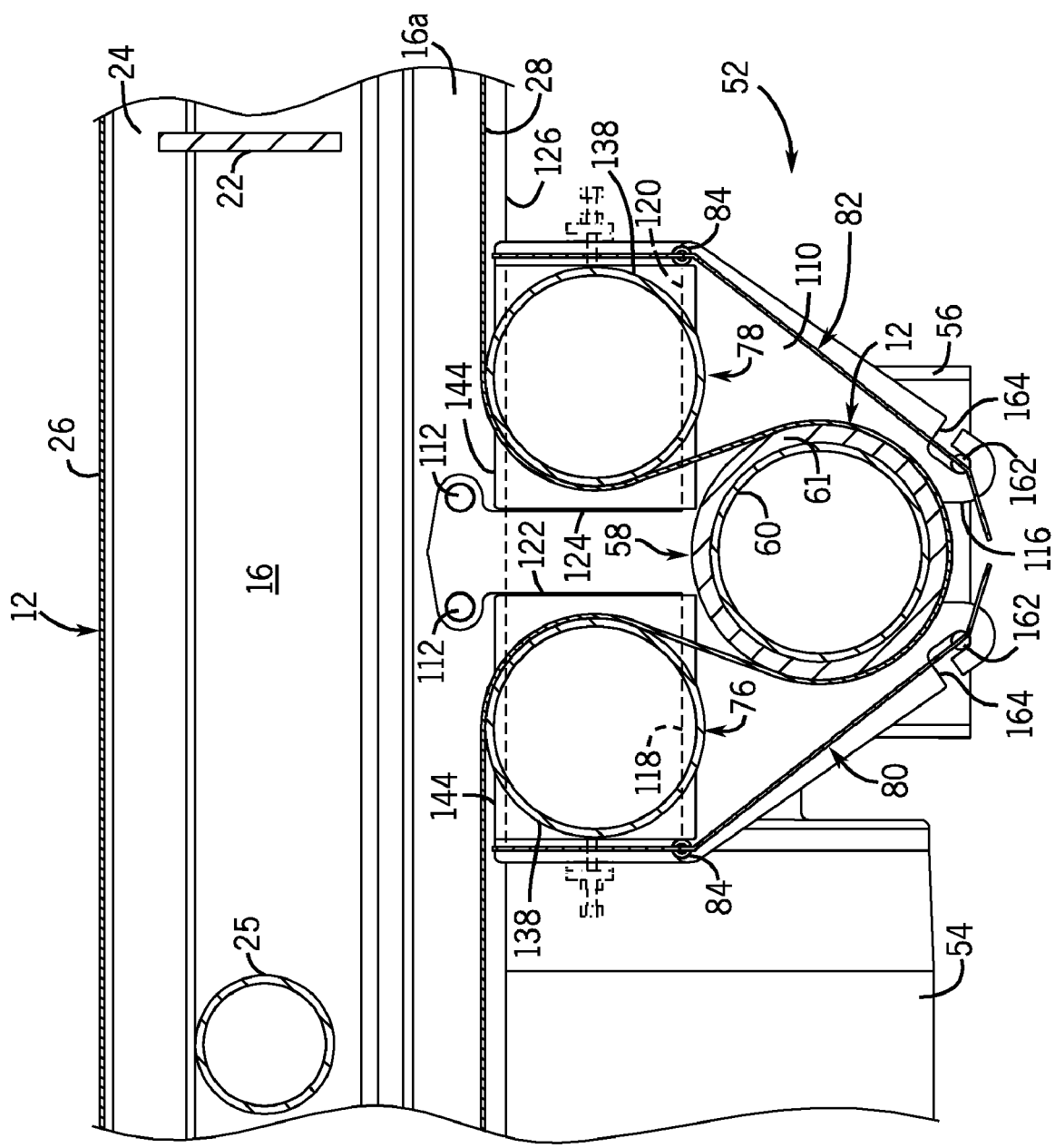
FIG. 7 is a sectional view of the center drive assembly as taken on line 7-7 of FIG. 1.

When the center drive assembly 52 is in the operating position shown in FIGS. 2 and 7, the lower run 28 of the conveyor belt 12 passes around portions of the outer circumference of the freely rotatable guide rollers 138 and the drive roller 61 that are driven by the drive motor 54 and the gear box 56. Appropriate tension on the belt 12 is applied by the tail assemblies 30, 32. The drive roller assembly 58 is held stationary by the mounting arrangement 86, and the guide roller assemblies 76, 78 are retained in the proper alignment by the roller adjustment devices 152 mounted to the guards 80, 82. The guards 80, 82 are retained between the side plates 108, 110 by means of the rod ends 162 seated in the slots 164 of the side plates 108, 110, and the extended ends of the retaining pins 84 engaged against the guard upper portions 160.

Figure 8:
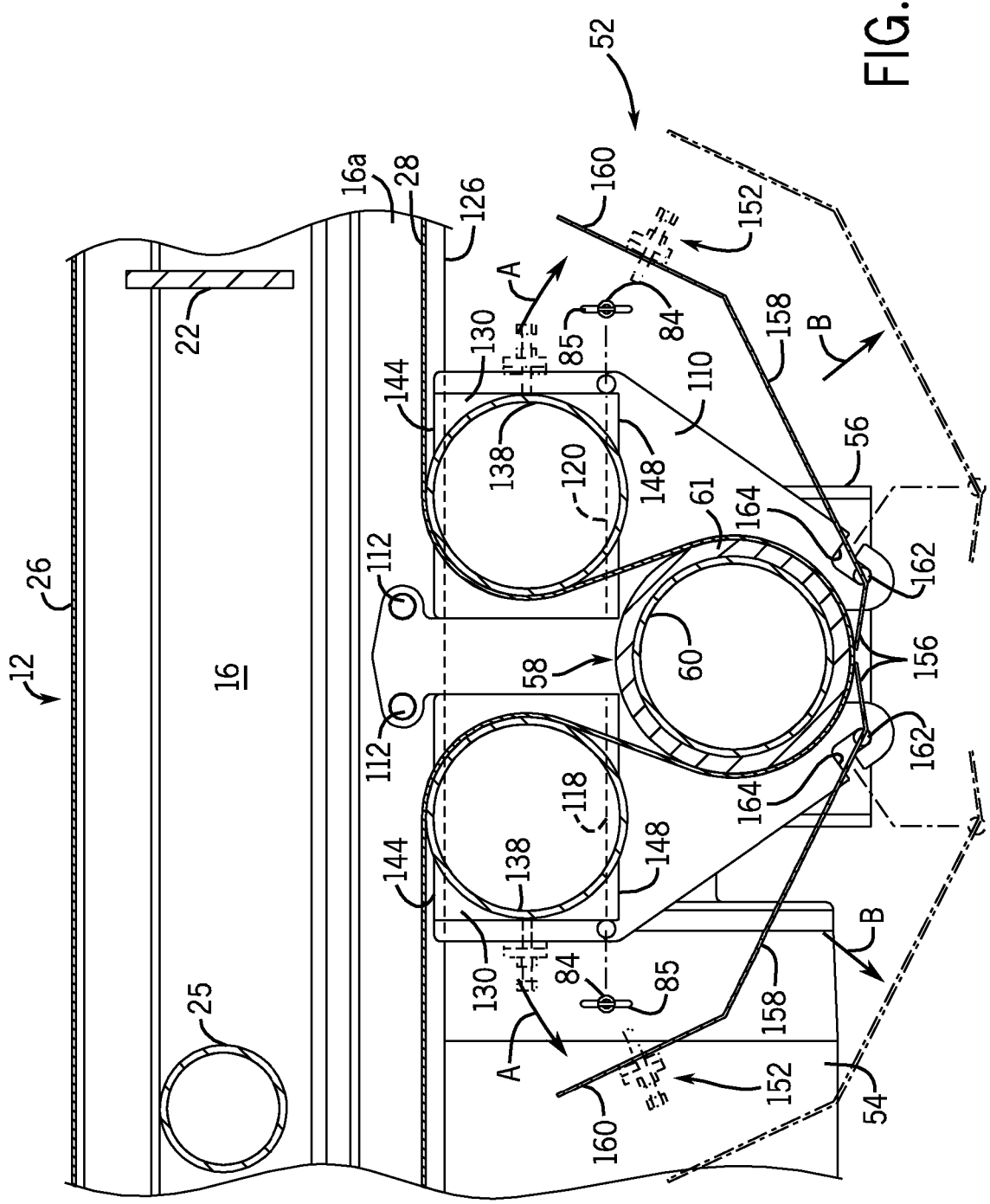
FIG. 8 is a view similar to FIG. 7 showing removal of the guards from the center drive assembly.

Should it become necessary to sanitize the conveyor assembly 10, the retaining pins 84 are extracted as shown in FIG. 8 by pulling on the finger rings 85. This allows the guards 80, 82 to be first manually pivoted downwardly about the rod ends 162 in the direction of arrows A, and then removed in the direction of arrows B by moving the rod ends 162 out of the slots 164. As illustrated, the roller adjustment devices 152 are mounted to the guards 80, 82 and are removed along with the guards.

Once the guards 80, 82 and roller adjustment devices 152 have been removed, the side blocks 128, 130 are slidably moved by hand outwardly along a path in the direction of arrows C in FIG. 9 until the respective upper and lower edges 144, 148 of the slide blocks 128, 130 are disengaged from the side plates 108, 110 and the offset portions 14a, 16a of the side frame members 14, 16. With the slide blocks 128, 130 and their associated guide roller assemblies 76, 78 removed, the lower run 28 of the conveyor belt 12 whose tension may be released at the tail assemblies 30, 32, is moved in the direction of arrows D so that the belt 12 is disengaged from the drive roller 61. At this point, the center drive assembly 52 is in its cleaning position, and access is allowed to cleanse various surface areas of the center drive assembly components and the conveyor belt 12. As a result, the center drive assembly 52 and the conveyor assembly 10 may be conveniently sanitized without the necessity of removing the conveyor belt 12, and without the need for any tools or screw-type connectors to assemble and disassemble the guide roller assemblies 76, 78 and the guards 80, 82.

Once the cleaning process is complete, the slide blocks 128, 130 and their associated guide roller assemblies 76, 78 are re-engaged between the pair of side plates 108, 110 in the opposite direction shown by arrows C in FIG. 9.

Once each of the slide blocks 128, 130 are repositioned relative to the side plates 108, 110, the rod ends 162 of each of the guards 80, 82 are repositioned within the respective slot 164. Once the rod ends 162 are properly positioned, the guards are rotated back into the operative position and are locked into place by the retaining pins 84 received within the respective grooves 154 of the side plates 108, 110.

As can be appreciated by FIGS. 8 and 9, the roller adjustment devices 152 are attached to each of the guards 80, 82 such that when the guards 80, 82 are returned to their operative position, the roller adjustment devices 152 correctly position the slide blocks 128, 130 within the open notches of the side plates 108, 110. In this manner, the previously set tracking adjustments for each of the guide roller assemblies are maintained upon the replacement of the guides 80, 82.

Once the guards 80, 82 have been repositioned in their operative positions, the tail assemblies 30, 32 are returned to their tension position, at which time the roller adjustment devices 152 maintain the proper tracking position of each of the guide roller assemblies and the guards are locked in place by the series of retaining pins 84.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. In a conveyor assembly having a continuous conveyor belt driven between a pair of spaced side frame members by a center drive assembly having a pair of spaced side plates connected to the side frame members, a drive roller arrangement engageable with the conveyor belt and driven by a drive motor arrangement mounted on the conveyor assembly and coupled to the drive roller arrangement to move the conveyor belt, a freely rotatable guide roller arrangement mounted between the side plates and engageable with the conveyor belt and guard structure attached to the side plates for protecting the conveyor belt, the improvement wherein:

the guide roller arrangement is slidably mounted between the side frame members and the side plates between an operating position in which the conveyor belt passes around the guide roller arrangement before engaging the drive roller arrangement, and a cleaning position in which the guide roller arrangement and the guard structure are slidably removable away and quickly detachable from the side frame members and the side plates and out of engagement with the conveyor belt, and the guard structure surrounds and normally prevents access to the drive roller arrangement, the guide roller arrangement and the conveyor belt, and includes a tracking adjusting arrangement engageable with the guide roller arrangement.

2. The improvement of claim 1, wherein the guard structure is retained in the operating position by elongated retaining pins that are pushed into a frictional engagement with the side plates and the guard structure, and removed to the cleaning position by pulling the retaining pins out of the frictional engagement.

3. The improvement of claim 1, wherein the guide roller arrangement includes slide block structure slidably movable into and out of cutouts defined by vertical and horizontal edges of the side plates and lowermost edges of the side frame members.

4. The improvement of claim 3, wherein the slide block structure is provided with grooves for receiving the lowermost edges of the side frame members and the horizontal edges of the side plates.

5. The improvement of claim 3, wherein the guard structure includes a pair of removable guards, each guard having a bent configuration with an upper portion disposed between the side plates, an intermediate portion and a lower portion formed with rod ends engageable in slots formed in the side plates when the guide roller arrangement is in the operating position.

6. The improvement of claim 5, wherein each of the removable guards includes a pair of roller adjustment devices each positioned in contact with the slide block structure of the guide roller arrangement.

7. The improvement of claim 6, wherein each of the roller adjustment devices are independently adjustable to provide tracking adjustment for the guide roller arrangement.

8. The improvement of claim 5, wherein the guards are retained in the operating position by the retaining pins acting against the upper portions of the guard.

9. The improvement of claim 5, wherein the guards are removed to the cleaning position by extracting the retaining pins, pivoting the guards about the rod ends in the slots, and manipulating the rod ends out of the slots.

10. The improvement of claim 1, wherein the guide roller arrangement includes a pair of guide roller assemblies.

11. The improvement of claim 1, wherein the guide roller arrangement and the guard structure are removed to the cleaning position without removal of the conveyor belt and without the use of tools.

12. A center drive assembly for a conveyor having a frame assembly extending from a first end to a second end and including a pair of spaced side frame members, at least one tail assembly mounted between the side frame members and a continuous conveyor belt having an upper run and a lower run engaged around the tail assembly and positioned between the side frame members, the center drive assembly comprising:
 a pair of spaced side plates each configured for attachment to one of the side frame members between the first end and the second end of the frame assembly, the side plates extending below the side frame members;
 a drive roller arrangement mounted between the pair of spaced side plates and positioned such that the lower run of the conveyor belt passes around at least a portion of an outer circumference of the drive roller arrangement;
 a drive motor arrangement mounted on one of the side frame members and coupled to the drive roller arrangement to rotate the drive roller arrangement and move the conveyor belt along a longitudinal length of the frame assembly;
 a pair of guide roller assemblies mounted for free rotation between the spaced side plates, wherein the guide roller assemblies are slidably movable between an operating position in which the lower run of the conveyor belt passes around at least portions of the outer circumference of the guide roller assemblies and a cleaning position in which the guide roller assemblies are slidably removable away from the side frame members of the side plates, and out of engagement with the conveyor belt; and
 a pair of removable guards surrounding and normally preventing access to the drive roller arrangement, the guide roller assemblies and the conveyor belt, wherein the removable guards include a pair of rod ends engageable in slots formed in the side plates, wherein the guards are each retained between the side plates in the operating position by a pair of elongated retaining pins each in frictional engagement with one of the side plates and the removable guard and are removed from the side plates in the cleaning position by pulling the retaining pins out of frictional engaggment,
 whereby the guide roller assemblies and the pair of removable guards are retained in the operating position and removed to the cleaning position without tightening and loosening of any cooperating connectors and without removal of the conveyor belt.

13. The center drive assembly of claim 12, wherein the side plates are formed with slots for receiving opposite ends of the drive roller arrangement.

14. The center drive assembly of claim 12, wherein each guide roller assembly includes a pair of slide blocks which are slidably movable into and out of cutouts defined by vertical and horizontal edges of the side plates and lowermost edges of the side frame members.

15. The center drive assembly of claim 14, wherein the pair of removable guards each includes a roller adjustment device, the roller adjustment device of each guard being positioned in contact with one of the slide blocks of the guide roller assembly, wherein the roller adjustment devices are adjustable to vary the orientation of the guide roller assembly.

16. The center drive assembly of claim 15, wherein the guards are retained in the operating position by the retaining pins acting against the upper portions of the guards.

17. The center drive assembly of claim 15, wherein the guards are removed to the cleaning position by extracting the retaining pins, pivoting the guards about the rod ends in the slots, and manipulating the rod ends out of the slots.

18. The center drive assembly of claim 15, wherein each of the roller adjustment devices are removable with the guards.

19. The center drive assembly of claim 14, wherein each of the slide blocks has upper and lower edges provided with grooves for receiving the lowermost edges of the side frame members and the horizontal edges of the side plates, and inner edges positioned adjacent top portions of the side plates when the guide roller assemblies are in the operating position.

20. In a conveyor assembly having a continuous conveyor belt driven between a pair of spaced side frame members by a center drive assembly having a pair of spaced side plates connected to the side frame members, a drive roller arrangement engageable with the conveyor belt and driven by a drive motor arrangement mounted on the conveyor assembly and coupled to the drive roller arrangement to move the conveyor belt, a freely rotatably guide roller arrangement mounted between the side plates and engageable with the conveyor belt and guard structure attached to the side plates for protecting the conveyor belt, the improvement wherein:
 the guide roller arrangement is slidably mounted between the side frame members and the side plates between an operating position in which the conveyor belt passes around the guide roller arrangement before engaging the drive roller arrangement, and a cleaning position in which the guide roller arrangement is slidably removable away from the side frame members and the side plates and out of engagement with the conveyor belt,
 wherein the guide roller arrangement includes slide block structure slidably movable into and out of cutouts defined by the side plates and lowermost edges of the side frame members, and
 wherein the guard structure includes a pair of removable guards, each guard having a bent configuration with an upper portion disposed between the side plates, an intermediate portion and a lower portion formed with rod ends engageable in slots formed in the side plates when the guide roller arrangement is in the operating position.

21. The improvement of claim 20, wherein each of the removable guards includes a pair of roller adjustment devices each positioned in contact with the slide block structure of the guide roller arrangement.

22. The improvement of claim 21, wherein each of the roller adjustment devices are independently adjustable to provide tracking adjustment for the guide roller arrangement.

23. The improvement of claim 20, wherein the guards are retained in the operating position by the retaining pins acting against the upper portions of the guard.

24. The improvement of claim 20, wherein the guards are removed to the cleaning position by extracting the retaining pins, pivoting the guards about the rod ends in the slots, and manipulating the rod ends out of the slots.

25. The improvement of claim 20, wherein the guide roller arrangement and the guard structure are removed to the cleaning position without removal of the conveyor belt and without the use of tools.

26. A center drive assembly for a conveyor having a frame assembly extending from a first end to a second end and including a pair of spaced side frame members, at least one tail assembly mounted between the side frame members and a continuous conveyor belt having an upper run and a lower run engaged around the tail assembly and positioned between the side frame members, the center drive assembly comprising:
- a pair of spaced side plates each configured for attachment to one of the side frame members between the first end and the second end of the frame assembly, the side plates extending below the side frame members;
- a drive roller arrangement mounted between the pair of spaced side plates and positioned such that the lower run of the conveyor belt passes around at least a portion of an outer circumference of the drive roller arrangement;
- a drive motor arrangement mounted on one of the side frame members and coupled to the drive roller arrangement to rotate the drive roller arrangement and move the conveyor belt along a longitudinal length of the frame assembly;
- a pair of guide roller assemblies mounted for free rotation between the spaced side plates, wherein the guide roller assemblies are slidably positioned on the side frame members and the side plates between an operating position in which the lower run of the conveyor belt passes around at least portions of the outer circumference of the guide roller assemblies for engaging the drive roller arrangement, and a cleaning position in which the guide roller assemblies are slidably removable away from the side frame members and the side plate and out of engagement with the conveyor belt; and
- guard structure covering the drive roller arrangement, the guide roller assemblies and the conveyor belt wherein the guard structure is retained between the side plates in the operating position and is removed from the side plates in the cleaning position,
- whereby the guide roller assemblies and the guard structure are retained in the operating position and removed to the cleaning position without tightening and loosening of any cooperating connectors and without removal of the conveyor belt,
- wherein each guide roller assembly includes a pair of slide blocks which are slidably movable into and out of cutouts defined by the side plates and the side frame members, and
- wherein the guard structure includes a pair of removable guards, each including a roller adjustment device, the roller adjustment device of each guard being positioned in contact with one of the slide blocks of the guide roller assembly, wherein the roller adjustment devices are adjustable to vary the orientation of the guide roller assembly.

27. The center drive assembly of claim 26, wherein the side plates are formed with slots for receiving opposite ends of the drive roller arrangement.

28. The center drive assembly of claim 26, wherein the guard structure is retained in the operating position by a set of elongated retaining pins that are pushed into a frictional engagement with the side plates and the guard structure, and removed to the cleaning position by pulling the retaining pins out of the frictional engagement.

29. The center drive assembly of claim 26, wherein the guards are retained in the operating position by the retaining pins acting against the upper portions of the guards.

30. The center drive assembly of claim 26, wherein the guards are removed to the cleaning position by extracting the retaining pins, pivoting the guards about the rod ends in the slots, and manipulating the rod ends out of the slots.

31. The center drive assembly of claim 26, wherein each of the side blocks has upper and lower edges provided with grooves for receiving the lowermost edges of the side frame members and the horizontal edges of the side plates, and inner edges positioned adjacent top portions of the side plates when the guide roller assemblies are in the operating position.

32. The center drive assembly of claim 26, wherein each of the roller adjustment devices are removable with the guards.

* * * * *